United States Patent [19]
McConnellogue et al.

[11] Patent Number: 5,215,587
[45] Date of Patent: Jun. 1, 1993

[54] SEALANT APPLICATOR FOR CAN LIDS

[75] Inventors: Neal J. McConnellogue, Lakewood; Neal McConnellogue, Jr., Denver; Randall Nichols, Lakewood; Samuel T. Wineland, Golden, all of Colo.

[73] Assignee: Conal Corporation, Golden, Colo.

[21] Appl. No.: 667,755

[22] Filed: Mar. 11, 1991

[51] Int. Cl.[5] .............................................. B05C 5/00
[52] U.S. Cl. .................................. 118/699; 118/705; 118/324
[58] Field of Search ............... 118/319, 324, 684, 699, 118/705; 156/578; 239/585; 222/504, 559

[56] References Cited

U.S. PATENT DOCUMENTS

| | | | |
|---|---|---|---|
| 2,189,783 | 2/1940 | Eberhart | 91/45 |
| 2,732,315 | 1/1956 | Birkland | 117/43 |
| 3,001,506 | 9/1961 | Ford | 118/318 |
| 3,521,598 | 7/1970 | Straw | 118/318 |
| 3,726,711 | 4/1973 | Hogstrom | 17/96 |
| 3,852,095 | 12/1974 | Hogstrom | 427/284 |
| 4,262,629 | 4/1981 | McConnellogue et al. | 118/668 |
| 4,295,573 | 10/1981 | Terry et al. | 156/578 |
| 4,498,415 | 2/1985 | Tsuchiga et al. | 118/712 |
| 4,840,138 | 6/1989 | Stirbis | 118/694 |

Primary Examiner—W. Gary Jones
Assistant Examiner—Charles K. Friedman
Attorney, Agent, or Firm—John E. Reilly

[57] ABSTRACT

A sealant applicator for dispensing sealant material under pressure from a nozzle onto a succession of can lids which are advanced into alignment with the sealant applicator nozzle includes a needle valve which is positively driven in a forward and reverse direction to open and close the nozzle under the control of a pair of solenoids arranged in back-to-back relation and an adjustable limit stop member to regulate the amount of sealant applied to each can lid. One or more sealant applicators may be mounted for rotation in synchronism with a rotatable chuck table and are program-controlled to control the amount of sealant applied to each lid.

13 Claims, 3 Drawing Sheets

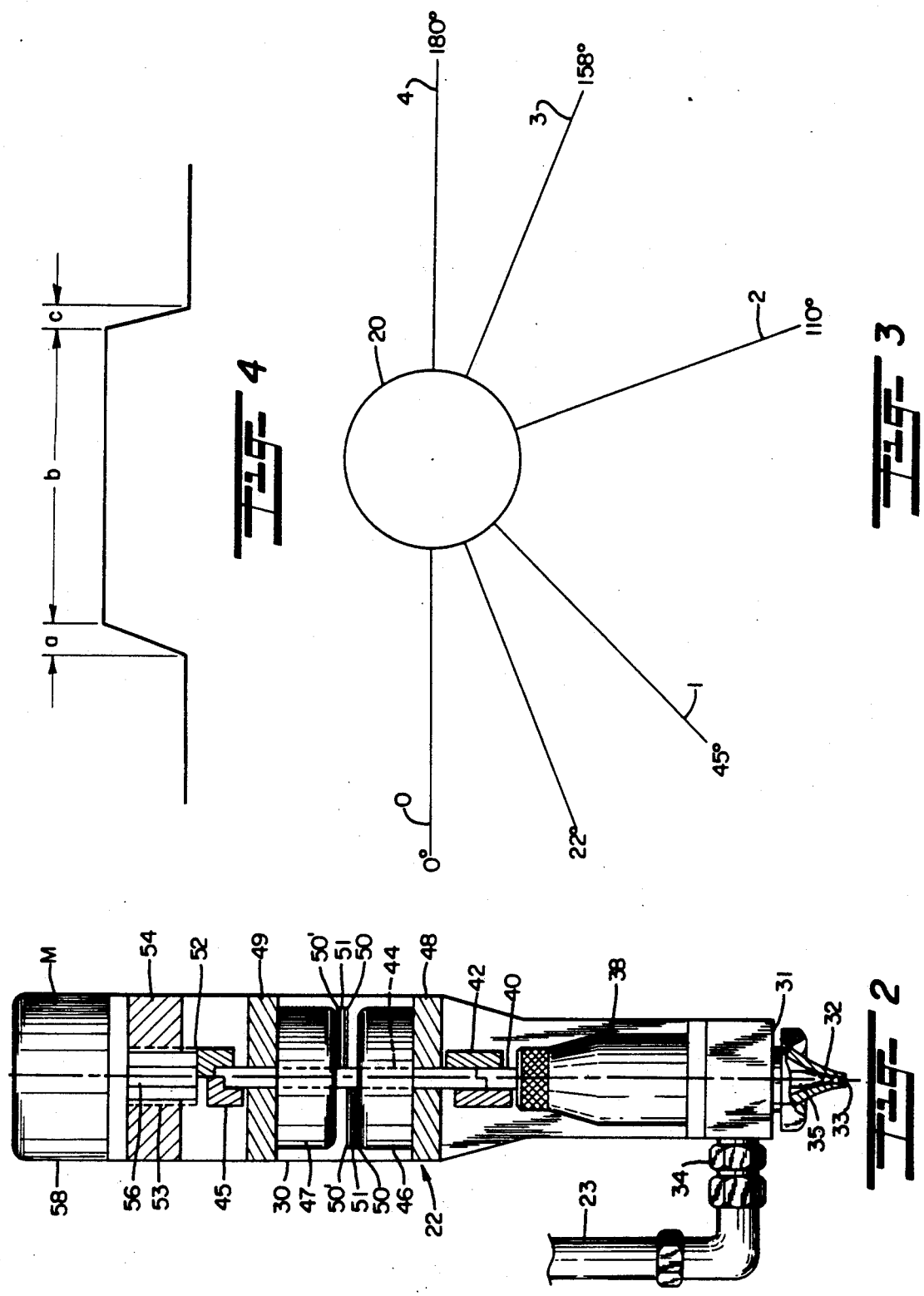

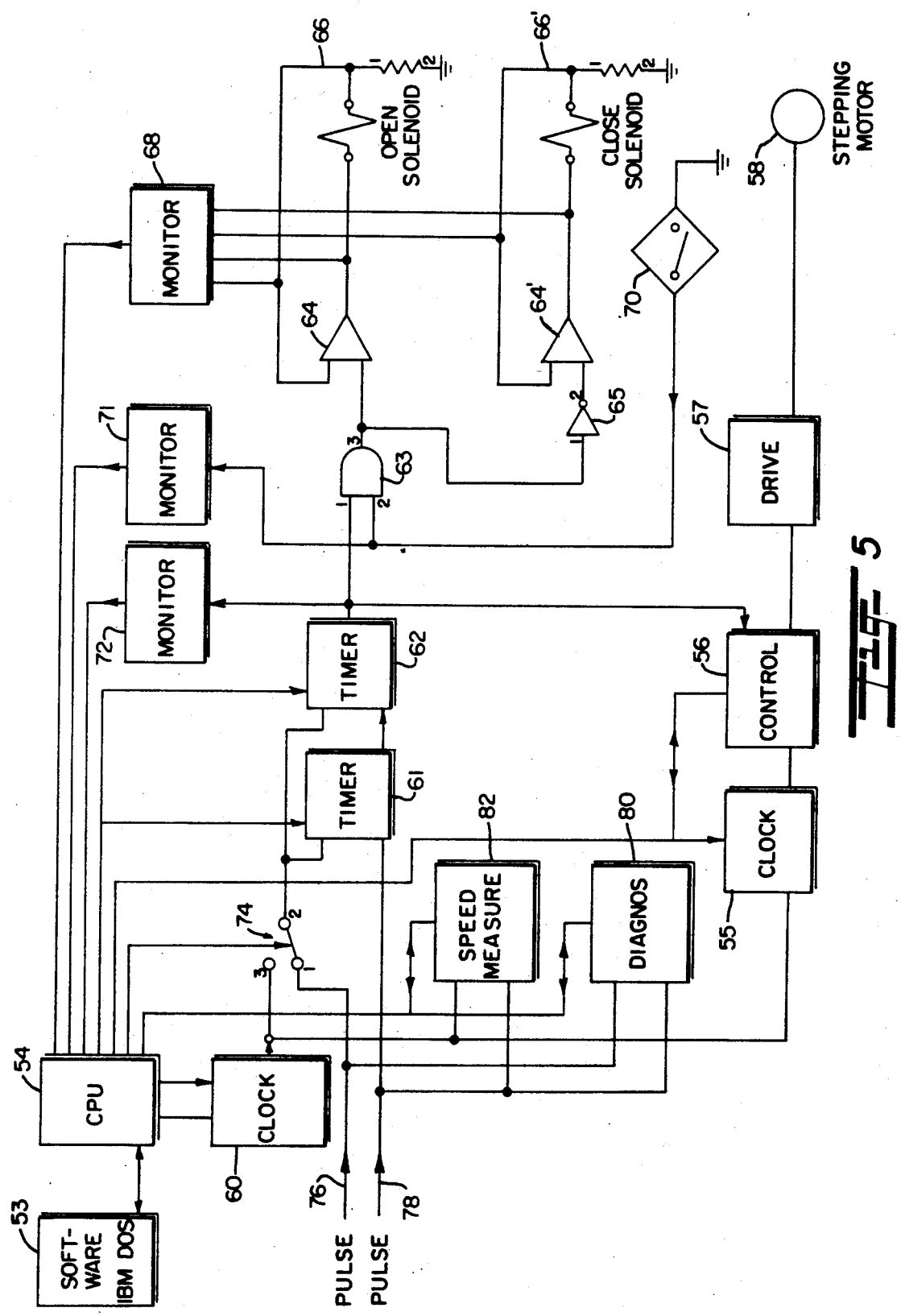

SEALANT APPLICATOR FOR CAN LIDS

This invention relates to dispensing apparatus; and more particularly relates to a novel and improved apparatus for applying sealant to can lids and the like.

BACKGROUND AND FIELD OF THE INVENTION

It is customary in can assembly operations to dispense a sealant material into an annular groove of a can lid for sealed attachment of the lid to the open end of a can body. Typically, this is done through the use of a rotary can end lining machine in which the sealant dispensing nozzle is opened mechanically and thereafter closed automatically by a spring. A compound cam and linkage usually form the mechanism for opening the nozzle, and the spring will then close the nozzle by advancing a valve stem into the nozzle opening. The can lids are advanced in rapid succession onto continuously rotating chuck(s) and one or more sealant applicator nozzles must be activated over a predetermined period of time to deliver a selected amount of sealant compound onto the groove of each lid as it is advanced into alignment beneath a nozzle, then rotated beneath the nozzle to evenly apply the sealant into the groove of the lid, following which the lid is ejected from the table into a collection area. Accordingly, the application of sealant to each lid in the proper amount and over a predetermined time period is a very highspeed, precise operation, and the setting of the nozzle and associated linkage requires regular maintenance in order to keep the amount of sealant applied within acceptable limits. In the past, this maintenance involved a high degree of skill and considerable downtime of the machine when adjustment was required or any breakage occurred.

It is therefore highly desirable to provide for a sealant applicator which eliminates the mechanical opening and closing control mechanisms employed in the past including any of the linkage required by existing mechanical designs. More specifically, it is proposed to electrically control opening and closing of the valve stem used in association with the nozzle and wherein the electrical control system is mounted directly in line with the valve stem so as to eliminate any direct or offset linkage and consequent wear on pivot points. Further, it is important to be able to adjustably control the amount of sealant applied to each can lid by closely coordinating the movement of the valve stem between the open and closed positions with the time interval established for application of the sealant.

The quality of sealant applied by each nozzle can be determined by pre-weighing and post-weighing each lid before and after the sealant is applied. In the mechanical systems previously employed, the stroke of the valve stem was adjusted to compensate for any changes in the weight or amount of sealant applied by each nozzle; however, the actual stroke was effected by the various linkage and tended to deteriorate with constant operation. As a result, it was necessary to stop the machine and make the necessary adjustments to control the stroke of the valve stem; and these adjustments would become more frequent as the linkage deteriorated. In accordance with the present invention, the stroke of the valve stem or needle is electrically activated and any adjustment required to the stroke is controlled by a stop member directly in line with the path of movement of the valve stem and which can be instantaneously adjusted to compensate for any changes in weight of the sealant applied to each nozzle without any downtime or interruption of the operation. Furthermore, the system of the present invention enables the opening time, duration of opening, closing and valve stroke to be controlled, adjusted and displayed on a screen so that the operator has complete control over each operation while the machine is running.

SUMMARY OF THE INVENTION

Accordingly, it is an object of the present invention to provide for a novel and improved dispenser apparatus and particularly of the type for applying a sealant to can lids or other articles to be adhered or sealed to another article or member.

It is another object of the present invention to provide for a novel and improved sealant applicator for applying a closely-controlled amount of sealant to an article to be sealed and which is especially adaptable for use in highspeed, automated operations wherein the rate and amount of sealant applied can be closely and automatically controlled while the machine is running.

It is a further object of the present invention to provide in a rotary end liner used in highspeed can assembly operations for a sealant applicator which is electrically controlled without the use of direct or offset linkage in such a way as to avoid downtime for replacement or adjustment of parts while achieving instanteous adjustment and control over the amount and rate of sealant application.

A still further object of the present invention is to provide in an end liner for a program-controlled sealant applicator for can ends which is of simplified construction and requires a minimum of maintenance and downtime while being highly effective and accurate in use.

In accordance with the present invention, a sealant applicator system has been devised wherein a predetermined quantity of sealant material is discharged under pressure from a nozzle onto a plurality of articles, each article being advanced in succession into alignment with the nozzle, and a valve stem is provided to move between a closed and open position for application of sealant onto each article, the improvement being directed to reversible drive means associated with the valve stem for reversibly driving the valve stem between the open and closed positions, and an adjustable limit stop member limits the travel of the drive means in advancing the valve stem between the open and closed positions thereby regulating the amount of sealant applied over the predetermined time interval selected.

In the preferred form of invention, the reversible drive means is defined by a pair of solenoids mounted in back-to-back relation on the axis or path of travel of the valve member so that the valve member is electromagnetically driven between the open and closed positions. Preferably, the valve member is in the form of a needle valve having an elongated valve stem which forms an axial continuation of an armature shaft through the solenoids, and the limit stop position is adjustably controlled by a computer to regulate the length of travel of the valve stem and thereby adjustably control the amount of sealant applied over a given time interval.

Another feature and advantage of the present invention is to utilize a ceramic material in the composition of the needle and nozzle elements and which material is of the necessary strength to withstand repeated opening and closing operations while being impervious to water and is extremely wear resistant thereby achieving longer operating life for the needle and nozzle member.

Other objects, advantages and features of the present invention will become more readily appreciated and understood when taken together with the following detailed description in conjunction with the accompanying drawings, in which:

BRIEF DESCRIPTION OF THE DRAWINGS

FIG. 2 is a sectional view in more detail of one of the preferred forms of sealant applicators as illustrated in FIG. 1;

FIG. 3 is a plan view of the rotary table of the end liner mechanism and schematically illustrating the advancement of a can end through a sealant applying cycle;

FIG. 4 is a timing diagram illustrating relative opening and closing times for the nozzle in a typical sealant operation; and FIG. 5 is a block diagram of a control circuit used for adjustably controlling the amount of sealant applied by each nozzle as in FIG. 1.

DETAILED DESCRIPTION OF THE PREFERRED EMBODIMENT

Figure 1:
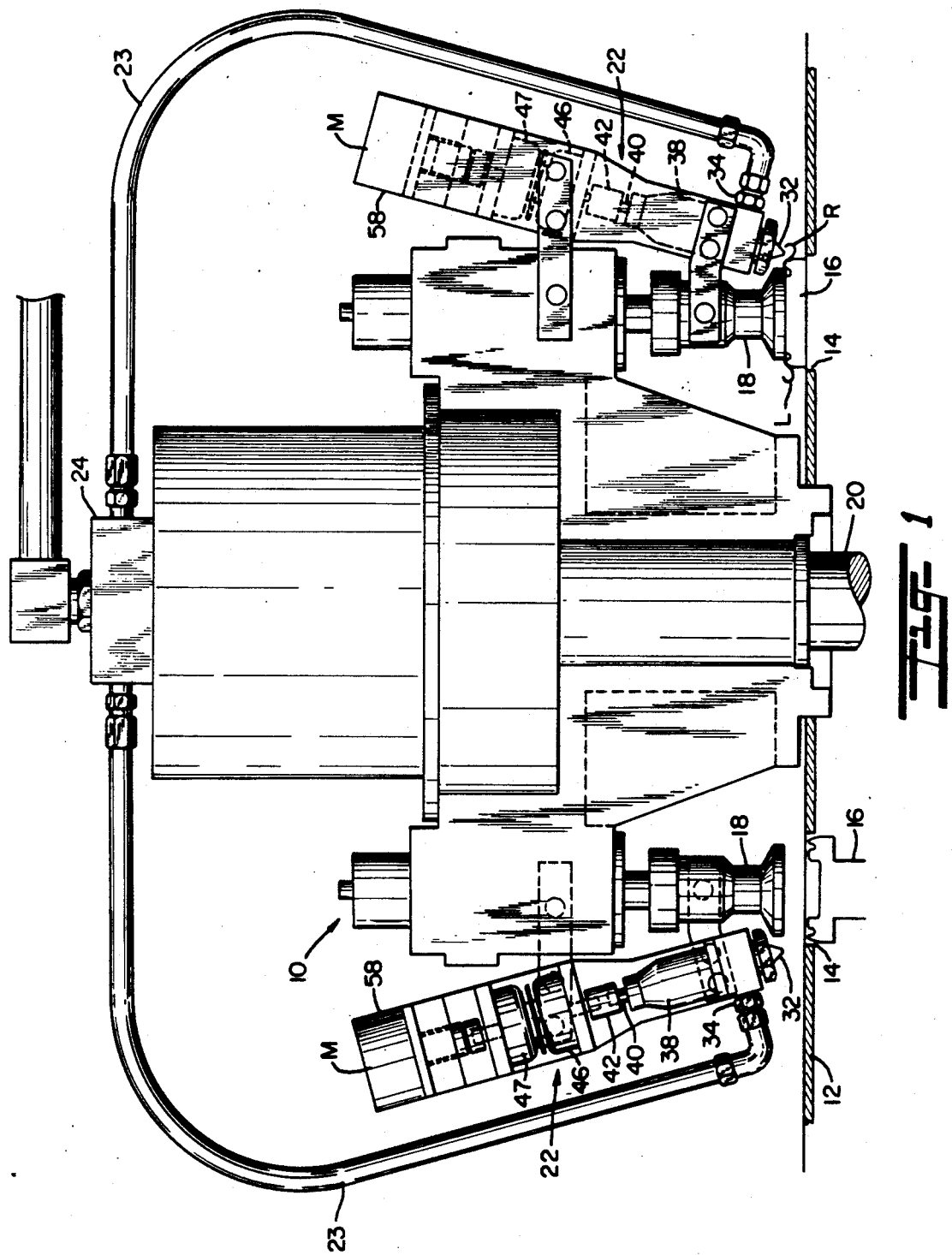
FIG. 1 is a front view in elevation of a rotary end liner mechanism employing a preferred form of sealant applicator in accordance with the present invention.

Referring in more detail to the drawings, there is shown by way of illustrative example in FIG. 1 a conventional form of end liner mechanism for application of a conventional sealant compound to a series of can lids which, in a well-known manner, are advanced onto a rotary table 12 of the mechanism 10. Each lid in succession is advanced into a position on an opening 14 of the table with an outer rim R facing upwardly, and a lower chuck mechanism 16 for each opening 14 lifts the lid L into engagement with an upper aligned chuck 18. There are a series of lower chucks 16 and a corresponding series of upper chucks 18 mounted at equally spaced circumferential intervals about a central drive column 20 so as to be rotated synchronously with the rotary table 12. The lower chucks 16 are independently rotated about their own axes, and the upper chucks 18 are journaled for independent rotation with the lower chucks 16 when each lid is lifted into engagement with an aligned upper chuck 18.

It is also standard practice to mount a sealant applicator or gun 22 in offset relation to each upper chuck 18 and which follows the advancement of the upper chuck 18 around the column 20. However, the sealant applicator 22 does not follow the independent rotation of the chuck 18 and, as a result, the outer rim R of each can lid L is rotated beneath the sealant applicator 22. Typically, a sealant compound is applied to each applicator 22 via an applicator line 23 from a manifold 24, the sealant being discharged under pressure through a lower nozzle end 32 of the applicator 22 and uniformly distributed into the inner grooved area of the rim R of each lid as the lid is rotated by the chuck assembly.

An important feature of the present invention resides in the method and means for each lid and for adjustably controlling the amount applied to each applicator 22. As shown in FIG. 2, the preferred form of applicator or sealant gun 22 is comprised of an elongated cylindrical barrel or housing 30 which converges forwardly or downwardly into a lower closed end portion 31 except for a limited aperture or opening which receives a nozzle 36 in communication with the lower interior of the barrel 30. The nozzle converges downwardly to terminate in a limited bore or opening 33 at its lower terminal end for discharge of the sealant, and the applicator line 23 also communicates with the lower end of the barrel via inlet port 34 directly above the nozzle 32. A valve stem or needle 36 is disposed in centered relation to the nozzle for movement along an axial path of travel between a closed position, as shown in full in FIG. 2, and an open or raised position, as shown dotted in FIG. 2. The valve stem for this purpose terminates in a lower tapered end 35 which is complementary to the inner wall surface of the nozzle so as to completely block the passage of sealant through the nozzle when in the closed position. The needle 36 extends upwardly through a conventional form of bonnet 38, the latter containing suitable packing and a return spring, not shown, but which normally urges the needle into the closed position with respect to the nozzle 32.

The needle 36 terminates in a rearward or upper end 40 which is coupled by means of a coupling sleeve 42 to a lower end of armature shaft 44. The armature shaft has an anvil or block 45 at its upper end, and a pair of solenoids 46 and 47 are disposed in back-to-back relation to one another, each mounted on a base plate 48 and 49, respectively. A pair of armature plates 50 and 50' are joined together by a common insulating portion or spacer 51 and are keyed to the shaft 44 in the gap formed between the solenoids 46 and 47.

Electrical leads, not shown, extend from a control circuit as illustrated in FIG. 5 to each of the solenoids 46 and 47 to positively drive the armature shaft 44 and attached needle 36 between the open and closed positions as shown in FIG. 2. Thus, activation of the solenoid 46 will overcome any spring resistance to drive the needle 36 to the open position as indicated on the right-hand side of center line Y in FIG. 2. Conversely, activation of the solenoid 47 and deactivation of solenoid 46 will cause the needle 36 to be driven forwardly into the closed position as indicated on the lefthand side of FIG. 2. It is important to regulate the length of stroke of the needle between the open and closed positions and thus the quantity of sealant applied over the given time interval that the nozzle is open and, to this end, extremely close control over the stroke of the needle is achieved by placement of an adjustable end stop or limit stop 52 in axially spaced relation to the block 45. The end stop 52 includes external threading 53 to mate with complementary threading on a threaded bore passing upwardly through mounting plate 54. In this relation, the base plates 48, 49 and mounting plate 54 are permanently attached to the inner wall surface of the barrel 30.

Rotational adjustment of the end stop 52 is effected by a drive shaft 56 extending downwardly from a motor drive 58 through a central opening in the end stop 52. The drive shaft 56 may be keyed in any suitable manner to the end stop 52 so that there is no slippage between the elements when the motor is energized to rotate the drive shaft. Again, FIG. 2 illustrates the relationship between parts in the open and closed positions, the left side of the center line Y illustrating the movable elements in the closed position and the right side illustrating the movable elements in the open position, except for the lower tapered end of the needle which is illustrated in full and dotted form as earlier described.

FIG. 3 schematically illustrates advancement of a can lid L along the rotary table, starting with the placement of a lid L in an opening 14 at station "0". From station "0" to station "1", the lower chuck 16 is lifted and rotated through a pre-spin period until it reaches a selected speed and moves into engagement with the upper chuck 18. During this time interval, the needle 36 is lifted from the closed to the open position as illustrated in the diagram, FIG. 4, between stations "0" and "1". Between stations "1" and "2", the lid is rotated through a predetermined number of turns while the sealant is continuously discharged through the nozzle onto the lid L and as represented by the corresponding time period in the diagram, FIG. 4. Between stations "2" and "3", the needle 36 is returned to a closed position by activating the solenoid 47 while the lid is being continuously rotated to spread the sealant evenly along the trough of the lid. At station "3", the chuck 16 is lowered away from the upper chuck 18 and the lid is automatically removed and discharged into a suitable collection area.

In practice, the quantity of sealant compound delivered by each applicator 22 is monitored by pre-weighing and post-weighing the lids discharged from each applicator and adjusting each applicator for any variations from the optimum quantity established. This quantity is controlled by adjusting both the length of stroke of the needle for each applicator and the time interval over which each nozzle is in the open position. Once the desired time interval is established for each nozzle, the degree of opening of the nozzle as determined by the lift of the needle during each stroke will then determine the weight or quantity of sealant delivered. Under continuous operation and consequent wear of the moving parts of each applicator, the length of needle stroke will require adjustment. As represented in FIG. 5, this is done by entering commands from the microprocessor under the control of the system software as represented at 53 to the stepper motor 58 at the upper end of each applicator, for example, as illustrated in FIGS. 1 and 2. Further as represented in FIG. 5, these control signals from the microprocessor to the stepper motor 58 are applied via motor speed clock circuit 55, motor control circuit 56 and motor drive 57. Thus, through the utilization of the stepper motor 58 it is possible to control the needle stroke without any down time and, in a manner now to be described, it is possible to adjust and control the duration of opening and closing of each nozzle 25 without interupting the end lining operation. To this end, as further illustrated in FIG. 5, a timer system clock 60 interfaces with the microprocessor 54 and delivers timing signals through timer circuits 61 and 62 to AND gate 63 and in turn to drivers 64 and 64' for driving the solenoids 46 and 47, respectively. An inverter 65 at the input to the driver 64' inverts the signals from the AND gate in driving the solenoid 47 and returning the needle valve to the closed position in each cycle. These signals from the coil drivers 64 and 64' are applied through a feedback loop as represented in 66 and 66' then applied through a coil driver monitor circuit 68 to the microprocessor. This information is then correlated by the microprocessor with other information needed for applying sealant to each lid. For instance, a proximity switch 70 is placed at each opening in the rotary table to driers 64 sense whether a lid is present as a preliminary to application of sealant and this signal is delivered through end switch monitor 71 to the microprocessor. In addition, timing signals are delivered via timer system monitor 72 back to the microprocessor as well as to the control circuit 56.

A pulse source selector switch 74 is controlled by the microprocessor to select either clock signals from the timer system clock 60 or encoder pulses over line 76, there being an encoder pulse generated for each 360° per revolution of the rotary table. Index pulses are delivered over line 78 to the delay timer 71 and duration timer 62 together with the encoder pulses and there is a single index pulse delivered for each revolution of the table. The encoder system diagnostics as represented at 80 verifies that there are 360 encoder pulses for each index pulse, and another clock circuit 82 measures the speed in RPM of the rotary table drive between each index pulse.

The intended function of the delay timer circuit 61 and duration timer 62 can be best understood by reference to FIGS. 3 and 4. An index pulse is received by the delay timer once each revolution and this is correlated with the advancement of a can lid into an opening at station "0" in FIG. 3. Again, between station "0" and station "1" the can lid will be lifted by the lower chuck into engagement with the upper chuck to impart rotation to the upper chuck and get it up to speed. The delay timer will sense the encoder pulse and establish a predetermined delay by counting the number of encoder pulses corresponding to the number of degrees between station "0" and station "1" before the needle is lifted to open the nozzle for that applicator. After the delay timer 61 times out it triggers the duration timer 62 to direct a signal to the AND gate 63 and coil driver 64 for that applicator causing the needle to move away from the closed position with respect to the nozzle. As illustrated in FIG. 4, there is a limited time period as designated at "a" during which the needle is advanced from the closed to the fully open position engaging the end stop, and the needle will thereafter remain open over the dwell period as designated at "b". This dwell period corresponds to the number of degrees that the nozzle remains open between stations "1" and "2", as illustrated in FIG. 3. A signal is then delivered at the end of that period, as determined by the duration timer, via the AND gate 63 to the inverter 65 to cause the solenoid 47 to be driven in the reverse direction closing the nozzle. The nozzle closing period as designated at "c" in FIG. 4 corresponds to the opening time period a. As the nozzle is being closed, the can lid will continue to undergo a post-spin period causing the sealant to be spread uniformly along the rim of the lid between stations "3" and "4" in FIG. 3. Thereafter the lower chuck is withdrawn away from the upper chuck and the lid is discharged into a collection area.

From the foregoing, the push-pull solenoid 46, 47 can be closely controlled to achieve maximum timing accuracy on the order of ¼ ms.; and in the system described it is possible to open and close the needle for each applicator within three ms. A typical dwell period for application of sealant is on the order of 40 ms. The push-pull solenoids also generate high opening and closing forces on the order of 50 lbs. or more with fast response time minimizing heating of the solenoid coils. The solenoid drive system will measure the response of the coils and automatically compensate for variations in coil response time, eliminating delay and duration errors. In turn, the encoder system will control delay and duration timing in machine time rather than real time thereby eliminating errors caused by machine speed variations.

In the programmable control circuits, standard IBM PC compatible software can employed which allows timing and flow adjustments via an RS-232 interface even while the machine is running. In this relation, a single circuit as illustrated by FIG. 5 is provided for each applicator but coordinated through a single CPU 54 and related software 53.

In the preferred form, both the needle 36 and the nozzle 32 are composed of a ceramic material, such as, Zirconia manufactured and sold by Coors Ceramic Co. of Golden, Colo. These materials also serve to minimize downtime resulting from rapid wear particularly when water base sealant compounds are being dispensed. Of course, selective use of ceramic materials for the needle and nozzle would be equally applicable to other compound end liners and not be restricted to the preferred form of system described.

It will be evident from the foregoing that while the preferred form of invention has been illustrated and described for use in connection with multiple sealant applicators which rotate about a common axis in following the advancement of the chucks, the invention is readily conformable for use with stationary sealant applicators or nozzles with each lid being advanced and rotated beneath a nozzle to apply sealant to the lid in the manner described. Further it is to be understood that the foregoing and other modifications and changes may be made in the construction and arrangement of elements comprising the present invention without departing from the spirit and scope thereof as defined by the appended claims.

We claim:

1. In dispenser apparatus wherein a sealant material is discharged under pressure from a nozzle onto a plurality of articles, each article being advanced in succession into alignment with said nozzle, and valve means is associated with said nozzle to move between a closed position and an open position whereby to control the application of sealant onto each article over a predetermined time interval, the improvement comprising:

reversible drive means associated with said value means for reversibly driving said valve means between said open and closed positions, said valve means including a valve member mounted for movement along a longitudinal axis in centered relation to said nozzle, said drive means defined by a paid of solenoids and means mounting said solenoids in closely spaced, coaxial relation to one another; and adjustable end stop means for limiting the distance of travel of said valve member when said valve member is driven to the open position thereby regulating the amount of sealant applied over the predetermined time interval.

2. In sealant applicator apparatus according to claim 1, including means for energizing said solenoids to positively drive said valve member to said open and closed positions.

3. In sealant applicator apparatus according to claim 1, said valve means being in the form of a needle valve having an elongated valve stem mounted for reciprocal movement along a longitudinal axis in centered relation to said nozzle, said solenoids drivingly connected to said valve stem including means for activating said solenoids to reversibly and positively drive said valve stem between the open and closed positions, and said valve stem and said nozzle being composed of a high strength, wear-resistant ceramic material.

4. In sealant applicator apparatus according to claim 3, and adjustable end stop means including a threadedly adjustable member disposed in axially spaced relation to said valve stem.

5. In sealant applicator apparatus according to claim 1, said valve means including a needle valve having a valve stem, a shaft coaxially mounted with respect to said valve stem, said reversible drive means including said pair of solenoids mounted in coaxial relation with respect to one another and with respect to said shaft, first means for energizing one of said solenoids to positively drive said valve stem in a direction advancing it to the closed position, and second means for positively driving the other of said solenoids in a direction away from said closed position into said open position.

6. In sealant applicator apparatus according to claim 5, said adjustable end stop means including a threadedly adjustable stop member mounted in axially spaced relation to one end of said shaft opposite to said nozzle, and rotary drive means for rotating said stop member whereby to adjustably control the open position of said valve means and the quantity of sealant discharged through said nozzle.

7. In sealant applicator apparatus according to claim 6, including timer means for regulating the time of energization of each of said solenoids.

8. In an end liner assembly wherein a quantity of sealant material is discharged under pressure from a sealant applicator nozzle onto each of a plurality of can lids, each lid being advanced in succession into alignment with said nozzle, and a needle valve having a valve stem movable along an axial path of travel between a closed position and an open position to control the application of sealant onto each said lid over a predetermined time interval, the improvement comprising:

reversible drive means associated with said needle valve for reversibly driving said valve stem between said open and closed positions, said reversible drive means defined by a pair of solenoids and means mounting said solenoids in closely spaced, coaxial relation to one another and in coaxial relation to said valve stem; and adjustable end stop means mounted in coaxial, spaced relation to said valve stem including adjustable control means for adjusting the spacing between said end stop means and said valve stem whereby to limit the travel of said valve stem in advancing said valve stem to the open position thereby regulating the amount of sealant applied over the predetermined time interval.

9. In an assembly according to claim 8, said solenoids disposed in opposed relation to one another and means for energizing said solenoids to positively drive said needle valve toward the open and closed positions.

10. In an assembly according to claim 8, said needle valve having an elongated valve stem mounted for reciprocal movement along an axis through the center of said nozzle, said reversible drive means including means for successively activating said solenoids to reversibly and positively drive said valve stem between the open and closed positions.

11. In an assembly according to claim 8, said adjustable end stop means including a threadedly adjustable member mounted in axially spaced relation to said valve stem.

12. In an assembly according to claim 8, said adjustable end stop means including a threadedly adjustable stop member mounted in axially spaced relation to one end of said armature shaft opposite to said nozzle, and rotary drive means including a stepper motor for rotating said threaded member whereby to adjustably control the length of stroke of said valve stem.

13. In an assembly according to claim 8, said needle valve having a valve stem, an armature shaft coaxially mounted with respect to said valve stem, said reversible drive means including a pair of solenoids mounted in coaxial relation with respect to one another and to said armature shaft, and energizing means for selectively and alternately energizing one of said solenoids to positively drive said valve stem in a direction advancing it to the closed position, and second means for positively driving the other of said solenoids in a direction away from said closed position into said open position.

* * * * *